(12) United States Patent
Metzgen

(10) Patent No.: US 11,714,448 B2
(45) Date of Patent: Aug. 1, 2023

(54) DETERMINING SUMS USING LOGIC CIRCUITS

(71) Applicant: SUPERFASTFPGA LIMITED, London (GB)

(72) Inventor: Paul James Metzgen, London (GB)

(73) Assignee: SUPERFASTFPGA LIMITED, Putney (GB)

( * ) Notice: Subject to any disclaimer, the term of this patent is extended or adjusted under 35 U.S.C. 154(b) by 57 days.

(21) Appl. No.: 17/029,712

(22) Filed: Sep. 23, 2020

(65) Prior Publication Data

US 2021/0099174 A1 Apr. 1, 2021

(30) Foreign Application Priority Data

Sep. 27, 2019 (GB) ...................................... 1913979

(51) Int. Cl.
| | |
|---|---|
| *G06F 7/501* | (2006.01) |
| *G06F 7/505* | (2006.01) |
| *G06F 1/03* | (2006.01) |
| *G06F 7/509* | (2006.01) |

(52) U.S. Cl.
CPC ................ *G06F 1/03* (2013.01); *G06F 7/501* (2013.01); *G06F 7/509* (2013.01); *G06F 7/5057* (2013.01)

(58) Field of Classification Search
CPC ............. G06F 7/50–5013; G06F 7/505; G06F 7/5057; G06F 7/509
See application file for complete search history.

(56) References Cited

U.S. PATENT DOCUMENTS

| | | | |
|---|---|---|---|
| 7,274,211 B1 | 9/2007 | Simkins et al. | |
| 2016/0246571 A1* | 8/2016 | Walters, III | ........... G06F 7/5057 |
| 2016/0315619 A1* | 10/2016 | Fan | ..................... H03K 19/1732 |

OTHER PUBLICATIONS

Poornima, N., and VS Kanchana Bhaaskaran, "Area efficient hybrid parallel prefix adders", Procedia Materials Science, vol. 10, pp. 371-380, 2015 (Year: 2015).*
Kumm, Martin et al., "Advanced Compressor Tree Synthesis for FPGAs", IEEE Transactions on Computers, Jan. 2018, 16 pages.
(Continued)

*Primary Examiner* — Matthew D Sandifer
(74) *Attorney, Agent, or Firm* — Fish & Richardson P.C.

(57) ABSTRACT

A logic circuit comprising: inputs for receiving multiple n-bit numbers, n being greater than one; and an adder capable of receiving m n-bit numbers, m being greater than one, and forming an output representing the sum of those numbers, the adder having a plurality of single-bit stages and being configured to form the sum by subjecting successive bits of each of the numbers to an operation in a respective one of the single-bit stages, the single-bit stages being such that the adder has insufficient capacity to add all possible combinations of bits in a respective bit position of m n-bit numbers; the addition circuit being configured to add the multiple n-bit numbers by: in the adder, adding a first one of the n-bit numbers to a value corresponding to a set of non-consecutive bits of another of the n-bit numbers to form a first intermediate value; adding the first intermediate value to a value corresponding to the bits of the said other of the n-bit numbers other than those in the said set to form a sum; and outputting the sum.

24 Claims, 9 Drawing Sheets

(56) References Cited

OTHER PUBLICATIONS

Parandeh-Afshar, Hadi et al., "Compressor Tree Synthesis on Commercial High-Performance FPGAs", ACM Transactions on Reconfigurable Technology and Systems, vol. 4(39):1-19, Dec. 2011, 19 pages.
Parandeh-Afshar, Hadi et al., "Exploiting Fast Cany-Chains of FPGAS for Designing Compressor Trees", School of Computer and Communication Sciences Ecole polytechnique Federal de Lausanne, 2009, 8 pages.
Xilinx, Vertex-5 FPGA User Guide, Mar. 16, 2012, 385 pages.
Search Report under Section 17(5) issued in related Application No. GB 1913979.9 dated Jun. 18, 2020, 4 pages.

* cited by examiner

DETERMINING SUMS USING LOGIC CIRCUITS

CLAIM OF PRIORITY

The present application claims priority to GB Patent Application Serial No. 1913979.9, filed on Sep. 27, 2019, the entire contents of which are hereby incorporated by reference.

BACKGROUND

The present invention relates to apparatus and methods for determining a sum of a plurality of multiple bit binary inputs using logic devices.

Logic devices can be used to perform logic functions. Programmable logic devices (PLDs) are a type of integrated circuit that can be programmed to perform specified logic functions. A field programmable gate array (FPGA) is one type of PLD. An FPGA is a semiconductor device that comprises a matrix of configurable logic blocks (CLBs) connected via programmable interconnects. An FPGA can be programmed by providing configuration instructions which determine the function of the programmable elements of the FPGA. Configuration instructions may be in the form of configuration data loaded into an internal memory cell of the FPGA. One example of an FPGA is a XILINX FPGA, such as the XILINX Virtex-5 FPGA, the XILINX Ultrascale FPGA, the XILINX Versal FPGA or any other XILINX FPGA.

There are many applications for FPGAs that require the addition of a plurality of numbers together. Examples include digital signal processing (DSP) processing applications such as filters, convolutions (used in speech or video processing), statistics gathering, and also in artificial intelligence and machine learning applications. Mathematical operations such as modular arithmetic, and complex functions such as square root, or cordic functions also require many additions to be performed.

Typically, a plurality of numbers can be summed by configuring an FPGA to act as shown in FIG. 1. FIG. 1 shows an adder tree 100 suitable for adding five multiple bit binary numbers 101—labelled in FIG. 1 as A, B, C, D and E. The adder tree 100 consists of 2:1 adders 102, 103, 104 and 105. The sum of the five multiple bit binary numbers 101 is output 106 by the adder tree 100.

In another typical example, a plurality of numbers can be summed by configuring an FPGA to act as shown in FIG. 2. FIG. 2 shows an adder tree 200 suitable for adding five multiple bit binary numbers 201—labelled in FIG. 2 as A, B, C, D and E. The adder tree 200 consists of a 3:1 adder 202 and 2:1 adders 203 and 204. The sum of the five multiple bit binary numbers 201 is output 205 by the adder tree 200.

U.S. Pat. No. 7,274,211 describes how the logic blocks of a XILINX FPGA can be configured as 3:1 addition logic (e.g. so as to perform the function of 3:1 adder 202 depicted in FIG. 2). However, data processed using the 3:1 adder configuration described by U.S. Pat. No. 7,274,211 typically experiences a higher latency than a 2:1 adder.

Owing to the widespread use of additions functions in many DSP applications and mathematical operations, these functions often consume a large amount of the available programmable logic resources on a programmable logic circuit. Therefore, it is desirable to increase the efficiency with which addition functions are performed. That is, it is desirable to reduce the latency associated with performing additions and/or reduce the chip area consumed by the hardware required to perform additions.

SUMMARY OF THE INVENTION

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the present invention there is provided a logic circuit configured to determine a sum of a plurality of multiple-bit inputs, the logic circuit comprising an adder comprising a plurality of single-bit stages having insufficient capacity to add all possible combinations of bits in a respective bit position of the plurality of multiple-bit inputs, the logic circuit being configured to: receive the plurality of multiple-bit inputs; add, at the adder, a set of non-consecutive bit position values of a first multiple-bit input of the plurality of received multiple-bit inputs to a second multiple-bit number derived from the plurality of received multiple-bit inputs so as to form an intermediate value; add the intermediate value to the remaining bit position values of the first variable multiple-bit input so as to form a second output; determine the sum of the plurality of multiple-bit inputs in dependence on the second output; and output the sum of the plurality of multiple-bit inputs.

Preferably, adding, at the adder, a set of non-consecutive bit position values only of a first multiple-bit input of the plurality of received multiple-bit inputs, to a second multiple-bit number derived from the plurality of received multiple-bit inputs so as to form an intermediate value.

The second multiple-bit number may be selected from the plurality of multiple-bit inputs.

The second multiple-bit number may be a set of non-consecutive bit position values of a second multiple-bit input of the plurality of received multiple-bit inputs.

The set of non-consecutive bit position values of the first multiple-bit input may be generated by splitting the first multiple-bit input into a first binary string comprising the bit values from the even bit positions of the first multiple-bit input and a second binary string comprising the bit values from the odd bit positions of the first multiple-bit input, and the set of non-consecutive bit position values of the first multiple-bit input may be the first binary string or the second binary string.

The remaining bit position values of the first multiple-bit input may be the other of the first binary string and the second binary string.

The logic circuit may be embodied on a XILINX FPGA, and each single-bit stage may comprise a look-up table having a 64-bit limit.

According to a second aspect of the present invention there is provided a logic circuit configured to determine the sum of a plurality of multiple-bit inputs, the logic circuit being configured to: receive the plurality of multiple-bit inputs; split at least one of the received multiple-bit inputs into two or more multiple-bit binary strings; route each of the two or more multiple-bit binary strings to a different adder for adding wherein each adder comprises a plurality of single-bit stages having insufficient capacity to add all possible combinations of bits in a respective bit position of the plurality of multiple-bit inputs; add an intermediate addition output having a contribution from one of the at least two binary strings to (i) the other(s) of the at least two binary strings, or (ii) at least one other intermediate addition output having a contribution from the other(s) of the at least two binary strings, so as to form a second output; determine the sum of the plurality of multiple bit input numbers in dependence on the second output; and output the sum of the plurality of multiple bit numbers.

The logic circuit may be further configured to split a multiple-bit input into two or more binary strings such that each bit of the split multiple-bit input contributes to only one of the binary strings and all of the bits of multiple bit input are allocated to a binary string.

The sum of the two or more binary strings may be equal to the multiple-bit input from which they are split.

The logic circuit may be further configured to split a received multiple-bit input into two binary strings, a first binary string comprising the bit values from the even bit positions of the first multiple-bit input and a second binary string comprising the bit values from the odd bit positions of the first multiple-bit input.

The first binary string may be routed to an adder for adding with at least one of the other multiple-bit binary inputs so as to form the intermediate addition output.

The logic circuit may be embodied on a XILINX FPGA, and each of the plurality of single-bit stages may comprises a look-up table having a 64-bit limit.

According to a third aspect of the present invention there is provided a logic circuit comprising: inputs for receiving multiple n-bit numbers, n being greater than one; and an adder capable of receiving m n-bit numbers, m being greater than one, and forming an output representing the sum of those numbers, the adder having a plurality of single-bit stages and being configured to form the sum by subjecting successive bits of each of the numbers to an operation in a respective one of the single-bit stages, the single-bit stages being such that the adder has insufficient capacity to add all possible combinations of bits in a respective bit position of m n-bit numbers; the addition circuit being configured to add the multiple n-bit numbers by: in the adder, adding a first one of the n-bit numbers to a value corresponding to a set of non-consecutive bits of another of the n-bit numbers to form a first intermediate value; adding the first intermediate value to a value corresponding to the bits of the said other of the n-bit numbers other than those in the said set to form a sum; and outputting the sum.

Preferably, in the adder, adding a first one of the n-bit numbers to a value corresponding to a set of non-consecutive bits only of another of the n-bit numbers to form a first intermediate value.

n may be greater than four.

The set of non-consecutive bits may be generated by splitting one of the n-bit numbers into a first binary string comprising the bit values from the even bit positions of the n-bit number and a second binary string comprising the bit values from the odd bit positions of the n-bit number, and the set of non-consecutive bits may be the first binary string or the second binary string.

The addition circuit may be implemented on a XILINX FPGA, and each of the plurality of single-bit stages may comprise a look-up table having a 64-bit limit.

The addition circuit may be implemented on a silicon-based integrated circuit.

The addition circuit may be implemented on a single integrated circuit substrate.

According to a fourth aspect of the present invention there is provided, a logic circuit for adding multiple-bit inputs by means of two or more adders, each adder being configured to add values input to the adder by applying successive portions of those inputs to one or more summation look-up tables, each look-up table storing value sets, each value set comprising a set of n input bit groups and a set of output bits representing the output of one or more logic operations on the set of n input bit groups, the look-up table being configured to receive a set of n bit groups and in response output the set of output bits in the same value set whose set of input bit groups match the received bit groups, the look-up table being sized so as to be incapable of storing sufficient value sets to represent all possible combinations of n input bit groups; the adding circuit being configured to disperse bits of at least one of the multiple-bit inputs between multiple ones of the adders in such a way that for all valid values of the multiple-bit inputs the bits received by the or each look-up table will necessarily match the input bit groups of one of the value sets of that look-up table.

The length of each bit group may be one bit. All possible binary values of each multiple-bit input may be valid. One of the multiple-bit inputs may be constrained to take a single binary value and other binary values of that multiple-bit input are invalid.

The least significant bits of all the multiple-bit inputs may be one. The least significant bit of at least one of the multiple-bit inputs may be zero.

According to a fifth aspect of the present invention there is provided, a method of determining a sum of a plurality of multiple-bit inputs using a logic circuit comprising an adder comprising a plurality of single-bit stages having insufficient capacity to add all possible combinations of bits in a respective bit position of the plurality of multiple-bit inputs, the logic circuit being configured to: receiving the plurality of multiple-bit inputs; adding, at the adder, a set of non-consecutive bit position values of a first multiple-bit input of the plurality of received multiple-bit inputs to a second multiple-bit number derived from the plurality of received multiple-bit inputs so as to form an intermediate value; adding the intermediate value to the remaining bit position values of the first variable multiple-bit input so as to form a second output; determining the sum of the plurality of multiple-bit inputs in dependence on the second output; and outputting the sum of the plurality of multiple-bit inputs.

According to a sixth aspect of the present invention there is provided, a method of determining the sum of a plurality of multiple-bit inputs using a logic circuit, the method comprising: receiving the plurality of multiple-bit inputs; splitting at least one of the received multiple-bit inputs into two or more multiple-bit binary strings; routing each of the two or more multiple-bit binary strings to a different adder for adding, wherein each adder comprises a plurality of single-bit stages having insufficient capacity to add all possible combinations of bits in a respective bit position of the plurality of multiple-bit inputs; adding an intermediate addition output having a contribution from one of the at least two binary strings to (i) the other(s) of the at least two binary strings, or (ii) at least one other intermediate addition output having a contribution from the other(s) of the at least two binary strings, so as to form a second output; determining the sum of the plurality of multiple bit input numbers in dependence on the second output; and outputting the sum of the plurality of multiple bit numbers.

According to a seventh aspect of the present invention there is provided, a method of adding multiple n-bit numbers using a logic circuit comprising: inputs for receiving multiple n-bit numbers, n being greater than one; and an adder capable of receiving m n-bit numbers, m being greater than one, and forming an output representing the sum of those numbers, the adder having a plurality of single-bit stages and being configured to form the sum by subjecting successive bits of each of the numbers to an operation in a respective one of the single-bit stages, the single-bit stages being such that the adder has insufficient capacity to add all possible combinations of bits in a respective bit position of m n-bit numbers; the method comprising: in the adder, adding a first one of the n-bit numbers to a value corresponding to a set of non-consecutive bits of another of the n-bit numbers to form a first intermediate value; and adding the first intermediate value to a value corresponding to the bits of the said other of the n-bit numbers other than those in the said set to form a sum; and outputting the sum.

According to a eight aspect of the present invention there is provided, a method for adding multiple-bit inputs by means of two or more adders, each adder being configured to add values input to the adder by applying successive portions of those inputs to one or more summation look-up tables, each look-up table storing value sets, each value set comprising a set of n input bit groups and a set of output bits representing the output of one or more logic operations on the set of n input bit groups, the look-up table being configured to receive a set of n bit groups and in response output the set of output bits in the same value set whose set of input bit groups match the received bit groups, the look-up table being sized so as to be incapable of storing sufficient value sets to represent all possible combinations of n input bit groups; the method comprising dispersing bits of at least one of the multiple bit inputs between multiple ones of the adders in such a way that for all valid values of the multiple-bit inputs the bits received by the or each look-up table will necessarily match the input bit groups of one of the value sets of that look-up table.

According to a ninth aspect of the present invention there is provided hardware description code comprising configuration instructions that, when executed at a logic circuit, cause the logic circuit to be configured in accordance with the principles described herein.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The examples described herein are be described with reference to a field programmable gate array (FPGA) as an example of a programmable logic device (PLD). It is to be understood that the principles described herein could be applied to any other type of logic device, or programmable logic device (PLD).

Figure 3:
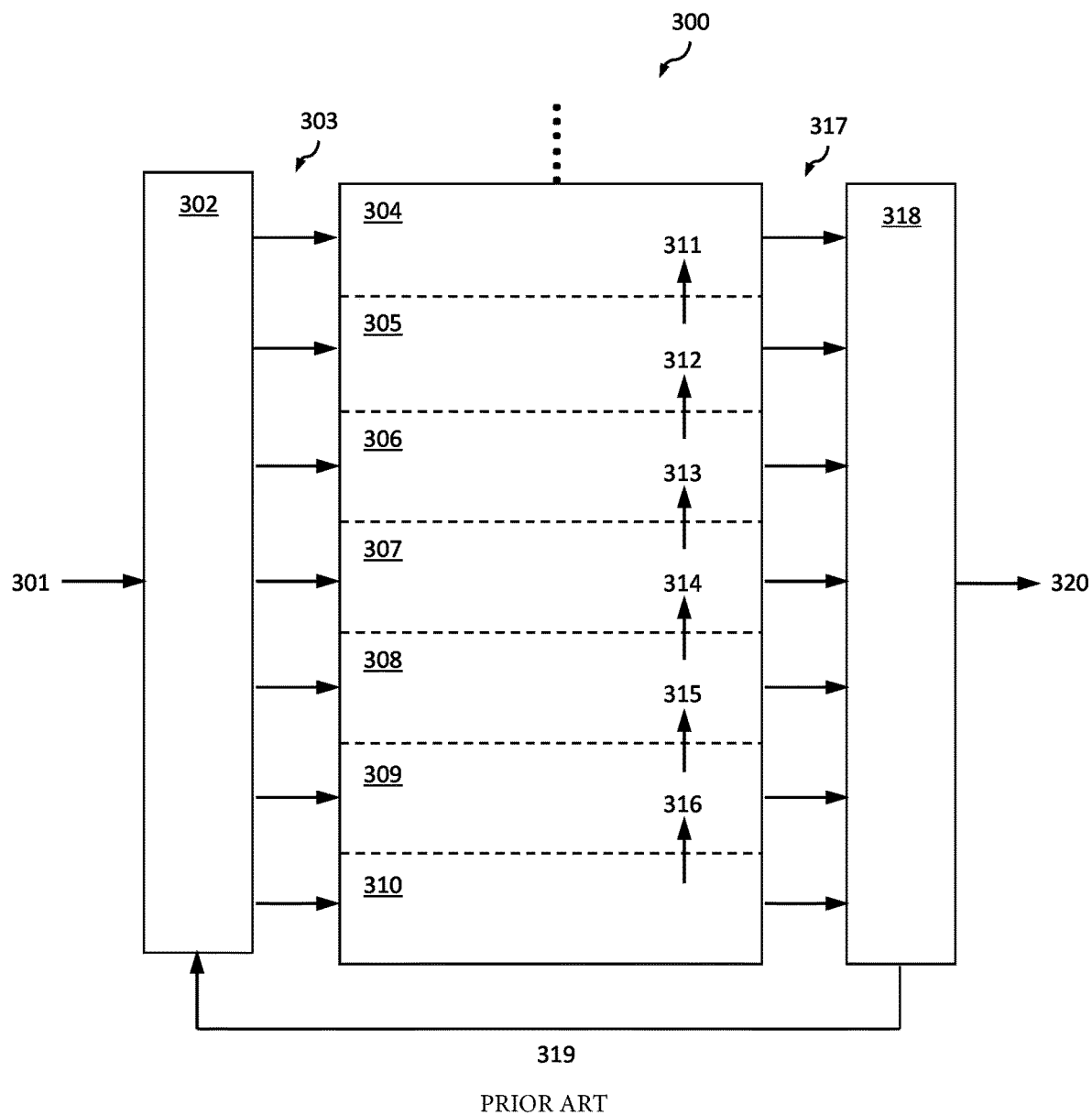
FIG. 3 is a simplified schematic of a field programmable gate array.

FIG. 3 is a simplified schematic of a field programmable gate array (FPGA) 300. In the example shown in FIG. 3, FPGA 300 comprises an input routing block 302, an output routing block 318, and a column of configurable logic blocks (CLBs) 304-310. Although shown separately, input routing block 302 and an output routing block 318 may be part of the same routing hardware. It is to be understood that a typical FPGA often comprise a number of columns of CLBs, each CLB column being in communication with one or more other CLB columns via routing hardware. Once data is on said routing hardware, it may be possible to route that data to any other element of the logic device. The routing blocks may comprise wiring, registers (e.g. flip-flops or latches), multiplexers and any other components for routing data (not shown). The input routing block 302 may receive inputs 319 from the output routing block 318, inputs 301 from a source external to the FPGA (e.g. an application running on a host data processing system), or inputs any other source (not shown). Inputs 301 and 391 may represent any number of inputs into the routing logic. The input routing block 302 and the output routing block 318, or the components thereof, may be configurable to route data on the FPGA in any suitable manner. In examples, input routing block 302 and the output routing block 318, or the components thereof, may be user-configurable or may be configured by an application running on a host data processing system. The input routing block 302 and the output routing block 318, or the components thereof, may be configured by loading a stream of configuration data into internal configuration memory cells (not shown) that define how the programmable elements are configured. The configuration data can be read from memory (e.g. from memory in a host data processing system) or written into the FPGA by an external device. The collective states of the individual memory cells then determine the function of the FPGA.

The FPGA 300 also comprises a plurality of programmable configurable logic blocks (CLBs) 304, 305, 306, 307, 308, 309 and 310. CLBs are an example of logic blocks. In FIG. 3 seven CLBs are shown. There may be any number of CLBs. As shown in FIG. 3, the CLBs may be arranged in a column having a plurality of rows, where each row represents one CLB. Although not shown in FIG. 3, there may be any number of columns of CLBs. A configurable logic block (CLB) is the basic repeating logic resource on an FPGA. A CLB can execute logic functions. CLBs may comprise components including look-up tables (LUTs), multiplexers (MUXs), flip-flops, exclusive or (XOR) gates, and any other components (not shown) for executing logic functions. Each CLB may be configurable to perform any number of logic functions. That is, the components of each CLB may be configurable by a user so as to manipulate data input into that CLB in a pre-determined manner. In examples, the CLBs, or the components thereof, may be user-configurable or may be configured by an application running on a host data processing system. A CLB, or the components thereof, may be configured by loading a stream of configuration data into internal configuration memory cells (not shown) that define how the programmable elements are configured. The configuration data can be read from memory (e.g. from memory in a host data processing system) or written into the FPGA by an external device. The collective states of the individual memory cells then determine the function of the FPGA.

There is a delay associated with processing data using logic blocks (e.g. the CLBs of an FPGA). There is also a delay associated with routing data between logic blocks. That is, a latency is incurred by processing data using logic blocks ((e.g. the CLBs of an FPGA), A latency is also incurred by routing data between logic blocks.

Input 301 into the input routing block 302 may be one or more multiple bit binary numbers to be processed by the FPGA, or the individual bits (and associated bit positions) of those multiple bit binary numbers.

Figure 1:
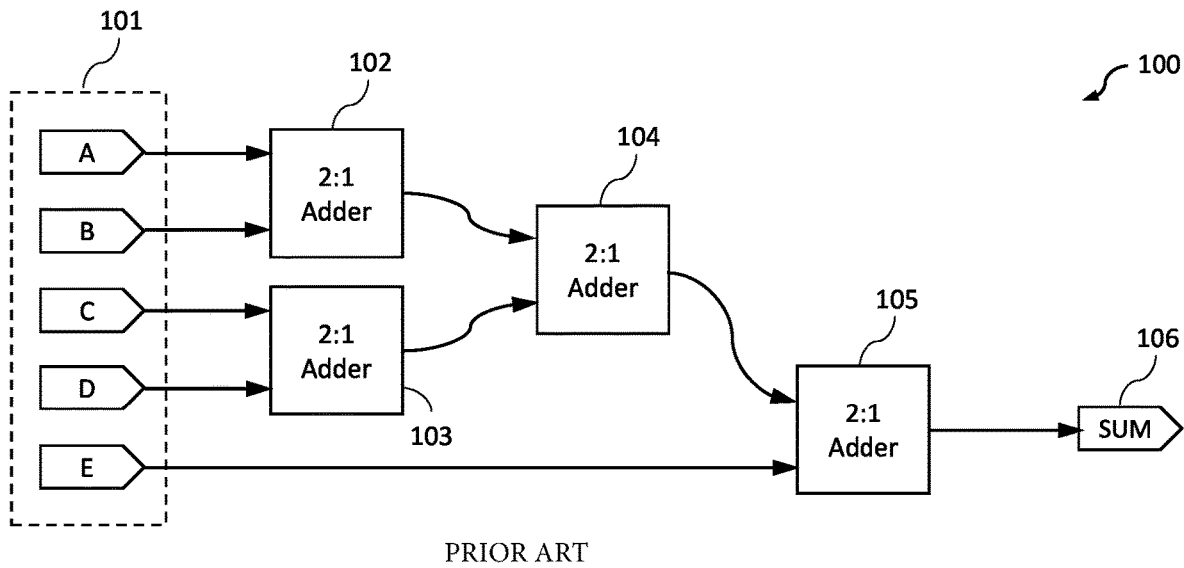
FIG. 1 shows an adder tree consisting of 2:1 adders for adding five multiple bit binary numbers.
Figure 2:
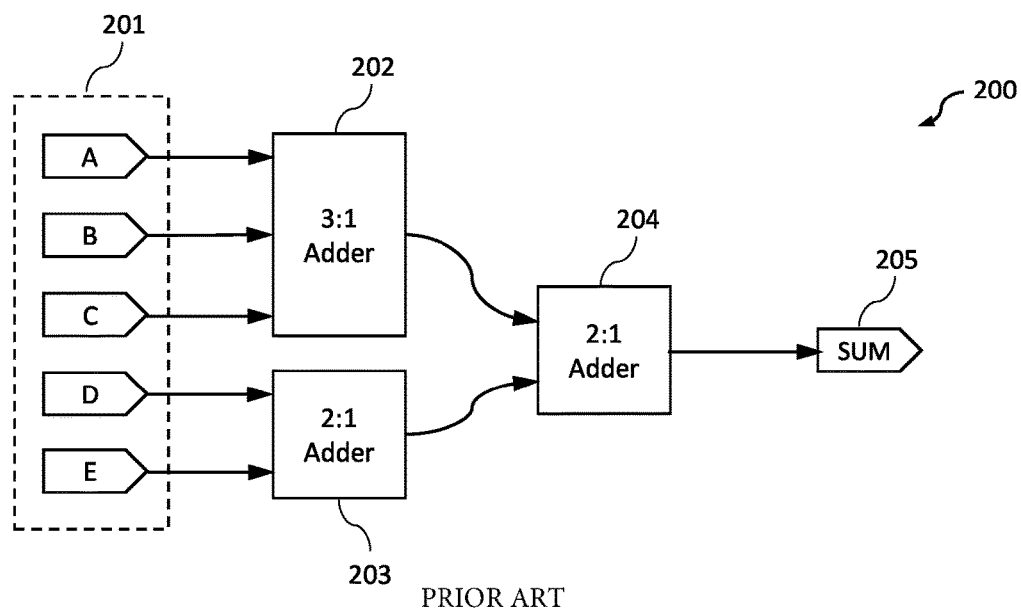
FIG. 2 shows an adder tree comprising 3:1 and 2:1 adders for adding five multiple bit binary numbers.

The input routing block 302 inputs 303 data to each CLB. Each input 303 may comprise a plurality of individual bits (e.g. rather than multiple-bit binary numbers). For example, FPGA 300 may be configured to act as a 2:1 adder (as shown in FIGS. 1 and 2) for adding two 6-bit binary numbers. Each CLB 305-310 may receive one or more individual bits of the input binary numbers. For example, CLB 310 may receive the least significant bit of each multiple bit binary number to be summed. CLB 309 may receive the least significant bit of each multiple bit binary number to be summed and the adjacent more significant bit. CLB 305 may receive the most significant bit of each multiple bit binary number and the adjacent less significant bit. Thus, a CLB is an example of a single-bit stage.

Continuing the example where FPGA 300 is configured to act as a 2:1 adder adding two 6-bit binary numbers. The outputs of each CLB 305-310 may be a sum bit and a carry bit. The sum bit output by each CLB may be output 317 to output routing block 318. The carry bit output by each CLB may be input 311-316 to the CLB above. Carry inputs/outputs 311-316 may be collectively referred to as a carry chain. The output 317 of CLB 304 may be a sum bit derived from the carry bit output 311 by CLB 305. Output routing block 318 may form a multiple bit binary number from the outputs 317 of CLBs 304-310 and output 320 that multiple bit binary number as the sum of the two 6-bit binary numbers.

As described herein, FPGA 300 may be configured to perform any logic function. Therefore, the inputs, outputs and logical operations of each CLB, and the configuration of input routing block and output routing block may differ from the specific example described herein.

One example of an FPGA is a XILINX FPGA—which are widely available and so are well understood by those skilled in the art. The examples described herein are described with reference to a XILINX FPGA. It is to be understood that the principles described herein could be applied to other FPGAs, or other PLDs.

Figure 4:
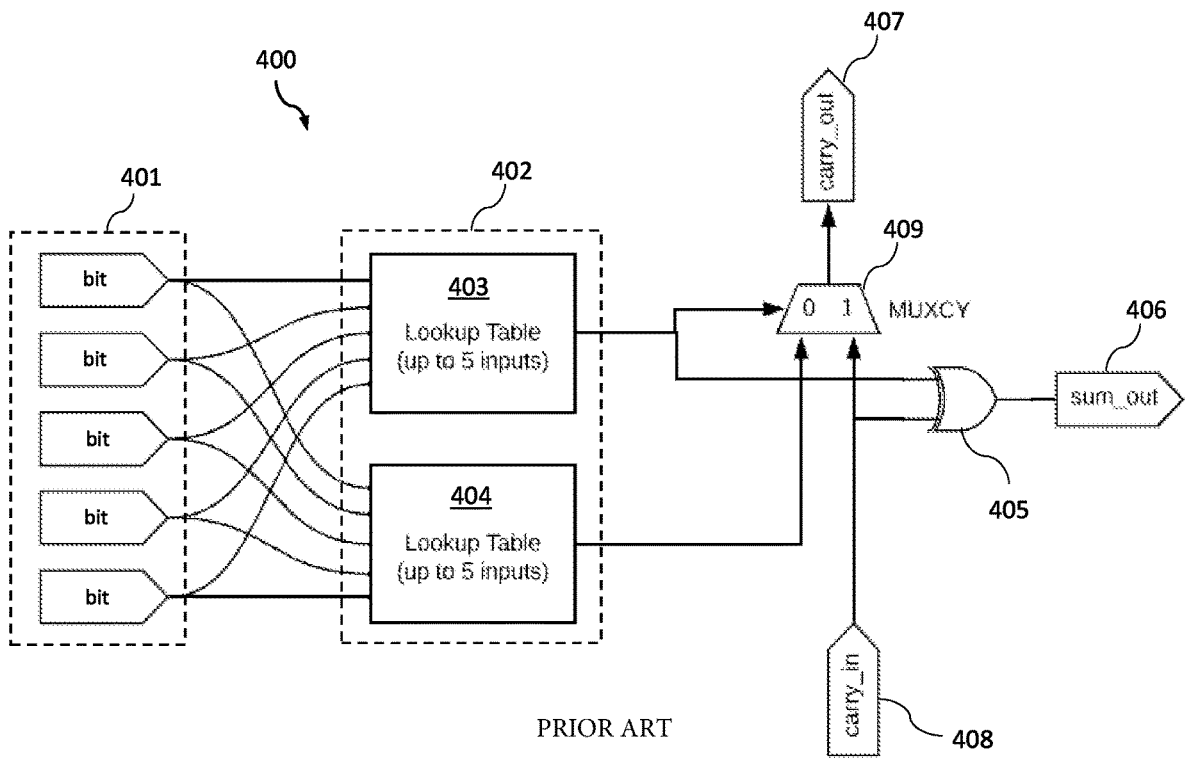
FIG. 4 shows the core elements of a typical FPGA configurable logic block (CLB).

FIG. 4 shows the core elements of a typical FPGA configurable logic block (CLB). That is, FIG. 4 shows the elements of each of CLBs 304-310 shown in FIG. 3. In particular, FIG. 4 shows the elements of a CLB in a XILINX FPGA.

As described herein a set of individual bits (rather than multiple-bit binary numbers) can be input 401 to CLB 400. FIG. 4 shows a CLB receiving five input bits. However, this is not intended to be limiting. A CLB may receive any number of input bits.

CLB 400 comprises a look-up table (LUT) 402. An LUT may be a collection of gates hardwired on the FPGA. An LUT may store output outcomes for given combinations of possible inputs. An LUT may provide a fast way to retrieve the output of a logic operation because possible results are stored and then referenced rather than needing to be calculated. For example, the LUT 402 may store output outcomes for one or more logical operations on input bits 401, or a subset of input bits 401, or any combination of one or more logical operations on one or more a subset of input bits 401. One way in which a logic block can be configured is by controlling the output outcomes stored in the available look-up table(s).

In a XILINX FPGA each CLB 400 is equipped with a look-up table (LUT) that can store up to 64 possible output outcomes. In other words, the look-up table has a 64-bit limit. Typically, an LUT having a 64-bit limit is configured as a pair of five input LUTs rather than just as a single six input LUT. This is because, for an LUT having five inputs, the total number of possible output outcomes to be stored is defined by $2^5$, which equals 32—meaning that, as shown in FIG. 4, it is possible to configure the LUT as a pair of five input LUTs 403 and 404 (e.g. $2^5+2^5=64$). Whilst, for an LUT having six inputs, the total number of possible output outcomes is defined by $2^6$, which equals 64. Other logic circuits, such as FPGAs, may enforce different limits on the number of output outcomes stored in the logic blocks look-up tables.

CLB 400 may also comprise an exclusive or (XOR) 405, which is a logical operation that outputs true (e.g. 1) only when inputs to the XOR are different. CLB 400 may also comprise a multiplexer (MUXCY) 409, which can receive two inputs, and select one of those inputs to propagate. The functions and uses of XOR 405 and MUXCY 409, including their roles in performing additions and/or subtractions, are well understood to the person skilled in the art, and so will not be discussed further herein. For example, the XILINX Virtex-5 FPGA User Guide, published 16 Mar. 2012, explains how to configure the XOR gates and multiplexers of an FPGA to perform the final stages of addition (accessible via https://www.xilinx.com/support/documentation/user guides/uq190.pdf—see e.g. pages 198 to 200).

CLB 400 may receive a carry in 408 from an adjacent, or previous, CLB. For example, if CLB 400 in FIG. 4 is equivalent to CLB 307 in FIG. 3, it would receive carry in 314 from CLB 308.

CLB 400 may output a carry out 407 to the adjacent, or next, CLB. For example, if CLB 400 in FIG. 4 is equivalent to CLB 307 in FIG. 3, it would output carry out 313 to CLB 306.

In one example, as shown in FIG. 4, MUXCY 409 may select carry out 407 from either an output of LUT 402 or carry in 408. The carry out may be defined relative to the inputs 401, a subset of the inputs 401 and/or the carry in 408 in any number of ways that are well understood to the person skilled in the art, and so will not be discussed further herein.

CLB 400 may output 406 the sum of the input bits 401, or a subset of the input bits 401. The sum may also account for a carry left over from the addition of bits in a less significant bit position. The carry from the sum of bits in a less significant bit position may be read from LUT 402 or may be carry in 408.

Returning to FIGS. 1 and 2. Both FIGS. 1 and 2 show adder trees configured to add five multiple bit numbers (A, B, C, D and E). The adder tree shown in FIG. 1 consists of 2:1 adders 102, 103, 104, and 105. A 2:1 adder is a form of addition logic that receives two multiple-bit inputs and sums them to output one multiple bit output. The adder tree shown in FIG. 1 comprises three levels of adder logic. That is, a first level including adders 102 and 103, a second level including adder 104, and a third level including adder 105. The adder tree shown in FIG. 2 comprises 3:1 adder 202 and 2:1 adders 203 and 204. A 3:1 adder is a form of addition logic that receives three multiple-bit inputs and sums them to output one multiple bit output. The adder tree shown in FIG. 2 comprises two levels of adder logic. That is, a first level including adders 202 and 203, a second level including adder 204. As described herein, there is a latency associated with routing data between adder levels. Therefore, the use of 3:1 adders would appear to be preferable, as the number of levels of adder logic can be reduced.

However, it may not straightforward to implement a 3:1 adder on an FPGA. In particular, it may not be straight forward to implement a 3:1 adder on a XILINX FPGA.

For a XILINX FPGA, it is known that one way of outputting a sum of multiple bit inputs A, B and C at a current bit position n, using only one carry chain, is to perform a set of logic operation on the bit values $a_n$, $b_n$, and $c_n$ of the multiple bit inputs A, B and C at the current bit position n and the bit values $a_{n-1}$, $b_{n-1}$, and $c_{n-1}$ of the three multiple bit inputs A, B and C at the adjacent, less significant bit position n-1. Generally, in the present specification, multiple bit binary numbers are represented by uppercase letters, whilst individual bits are represented by lowercase letters with a subscript indicating their bit position in a multiple bit binary number.

Figure 5:
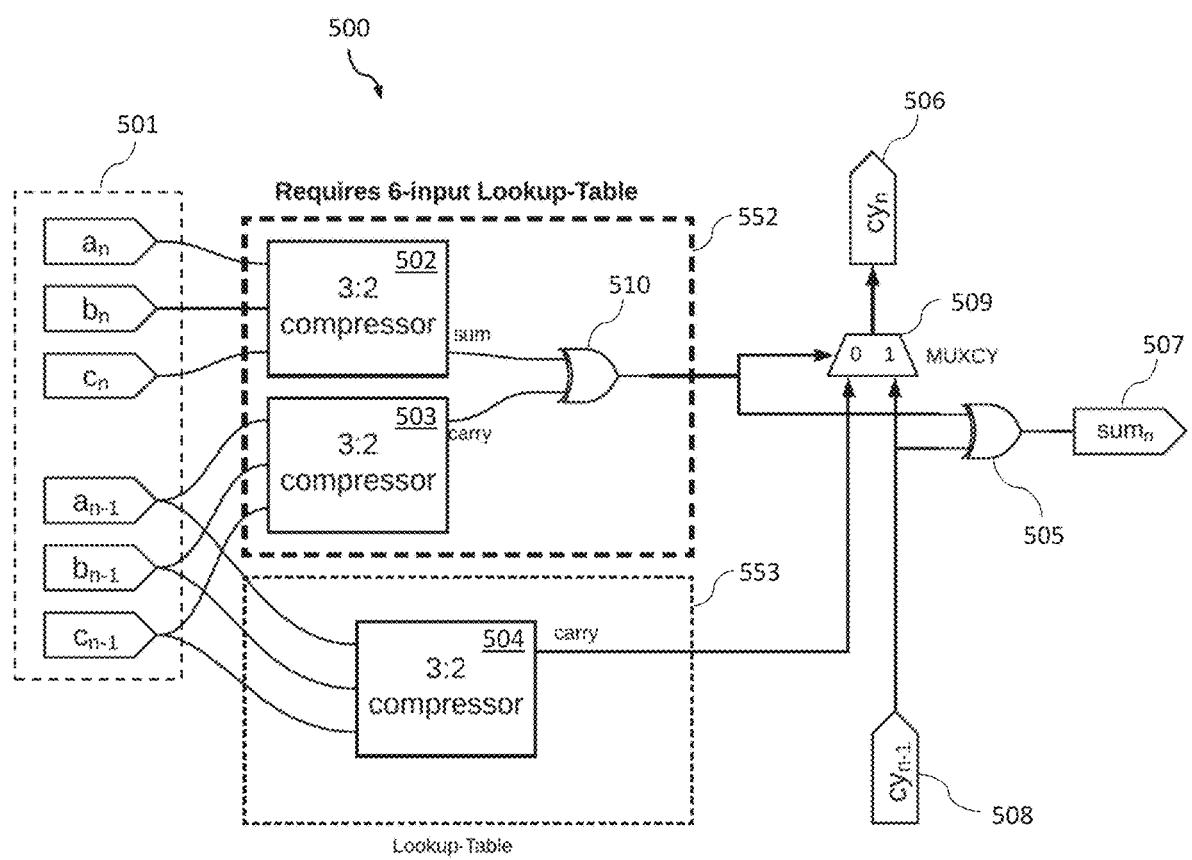
FIG. 5 shows an incompatible mapping of a 3:1 adder onto a single logic block of a XILINX FPGA.

FIG. 5 shows an incompatible mapping of a 3:1 adder onto a single logic block of a XILINX FPGA. FIG. 5 shows one configurable logic block 500 of 3:1 adder, such as 3:1 adder 202 as shown in FIG. 2. As shown in FIG. 2, 3:1 adder 202 adds three multiple bit binary inputs A, B and C. Configurable logic block 500, if it could be configured as shown in FIG. 5, would generate a sum 507 for one bit position (e.g. the nth bit position) within those multiple-bit numbers. Configurable logic block 500 would then be repeated a number of times commensurate with the number of bits in the multiple-bit binary number inputs.

One of the ways in which a configurable logic block may be configurable to perform different logic operations is by controlling the entries in the look-up table (LUT). Regarding FIG. 5, the circuitry (e.g. the 3:2 compressors, otherwise known as full adders, 502, 503, 504, and XOR 510) within the LUTs 552, 553 is shown purely as a visual aid. The circuitry itself may not actually be present. Instead, in order to perform the sum at bit position n, the LUT would need to be able to store all potential output outcomes for the shown visual aid logic operations were they to be performed on inputs $a_n$, $b_n$, $c_n$, $a_{n-1}$, $b_{n-1}$, and $c_{n-1}$. That is, a first LUT 552 would be required to store all potential output outcomes from the sum of a 3:2 compression 502 of bits at the current bit position XOR'ed 510 with a carry from a 3:2 compression 503 of the bits at the previous bit position, (n-1). A second look up table would be required to store all potential output outcomes from the sum of a 3:2 compression of bits at the previous bit position (n-1). The outputs from such LUTs 552, 553 could be operated on as shown in FIG. 5 by XOR 505, and MUXCY 509, in combination with carry in 508, so as to provide a sum 507 for the current bit position, n. As described herein, such an operation by XOR 505, and MUXCY 509 would be well understood by the skilled person.

However, this mapping is not compatible with a XILINX FPGA. That is, it is not possible to implement the adder circuitry shown in FIG. 5 on a XILINX FPGA. This is because the number of possible inputs for which output outcomes must be stored exceeds the maximum number of bits in the look-up table LUT 552, 553. As described herein, a XILINX FPGA enforces a 64-bit limit on the number of entries in the look-up table (LUT) in each configurable logic block (CLB). That is, such a mapping would require a first look up table 552 having 6 inputs (i.e. storing $2^6=64$ possible output outcomes) and a second look-up table 553 having 3 inputs (i.e. storing $2^3=8$ possible output outcomes). This exceeds the maximum number of inputs, 64 bits, in the lookup table of a XILINX FPGA. Thus, it is not possible to map a 3:1 adder onto a single configurable logic block of a XILINX FPGA as shown in FIG. 5.

Figure 6:
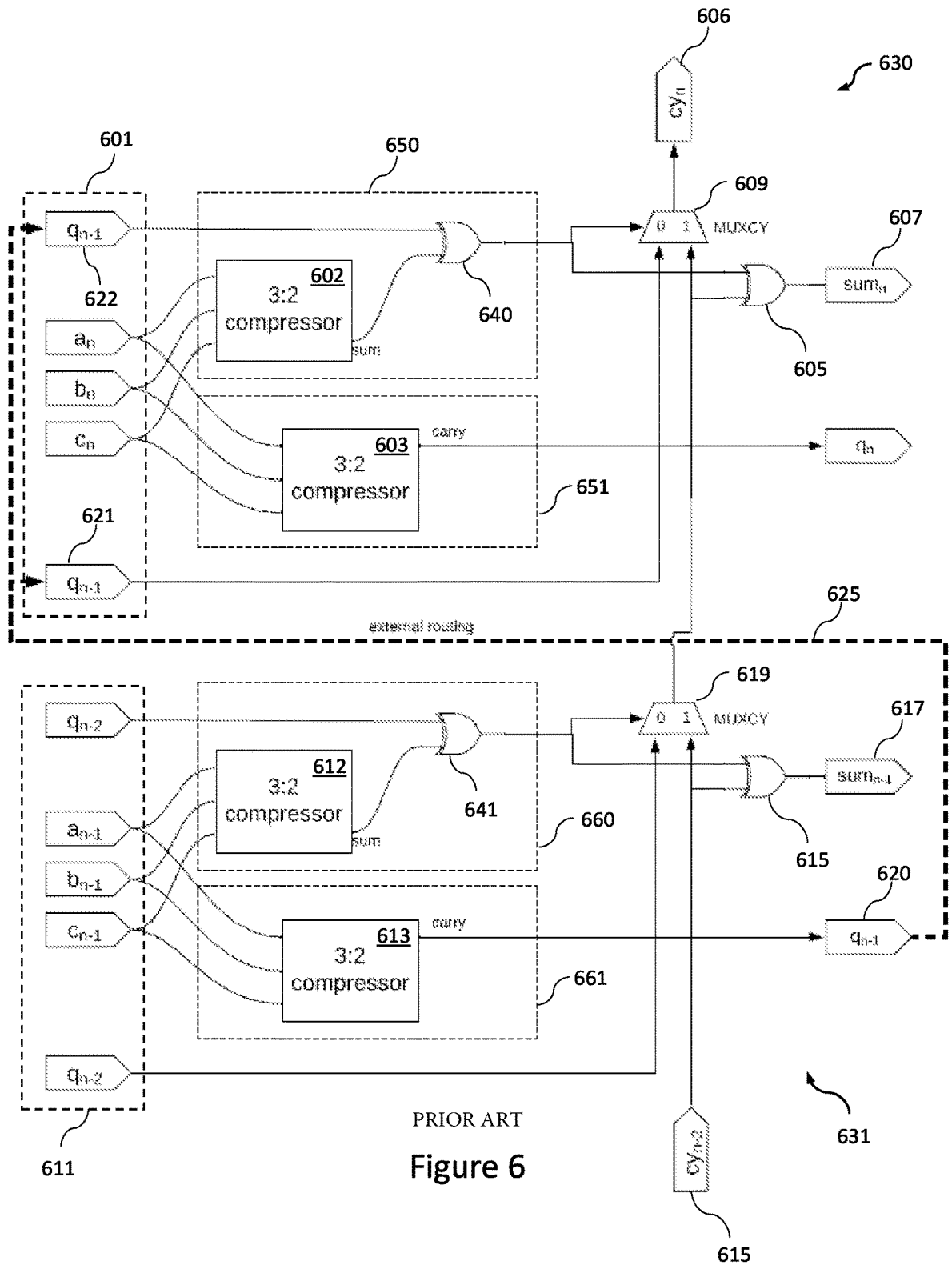
FIG. 6 shows a known solution to implementing a 3:1 adder on a XILINX FPGA.

U.S. Pat. No. 7,274,211 describes a known solution for configuring the logic blocks of a XILINX FPGA as 3:1 addition logic (e.g. so as to perform the function of 3:1 adder 202 depicted in FIG. 2). FIG. 6 schematically shows such a known solution to implementing a 3:1 adder on a XILINX FPGA.

FIG. 6 shows two configurable logic blocks 630 and 631 of a programmable logic circuit. Configurable logic block 630 generates a sum 607 for the current bit position, n, whilst configurable logic block 631 generates a sum 617 for the previous bit position, (n-1).

As described herein, it is known that one way of outputting a sum of multiple bit inputs A, B and C at a current bit position n, using only one carry chain, is to perform a set of logic operation on the bit values $a_n$, $b_n$, and $c_n$ of the multiple bit inputs A, B and C at the current bit position n and the bit values $a_{n-1}$, $b_{n-1}$, and $c_{n-1}$ of the three multiple bit inputs A, B and C at the adjacent, less significant bit position n-1.

Regarding FIG. 6, the circuitry (e.g. the 3:2 compressors, otherwise known as full adders, 602, 603, 612, 614 and XOR 640 and 641) within the LUTs 650, 651, 660, 661 is shown purely as a visual aid. The circuitry itself is not actually present. Instead, the look-up tables 650, 651, 660 and 661 store possible output outcomes for the shown visual aid logic operations were they to be performed on the shown inputs.

Instead of storing possible output outcomes in LUT 650 that take account of all potential carries from a 3:2 compression of previous bit positions (e.g. $a_{n-1}$, $b_{n-1}$, and $c_{n-1}$, as shown in LUT 553 in FIG. 5), the carry 620 from a 3:2 compression of previous bit positions (e.g. $q_{n-1}$, for $a_{n-1}$, $b_{n-1}$, and $c_{n-1}$) is determined in LUT 661 of adjacent CLB 631 and routed 625 from CLB 631 into the inputs 601 of the CLB 630.

The same routed carry, $q_{(n-1)}$ 621, is also input directly into the MUXCY 609, meaning that the second look-up table is not used to generate the carry from a 3:2 compression of previous bit positions (as in LUT 553 shown in FIG. 5). This means that the second LUT 651 can be used to calculate the carry, $q_n$, from a 3:2 compression of the current bit position, which can be routed the next CLB (not shown). This reduces the numbers of inputs into LUT 650 and 651 to three each, and so the 64-bit limit for LUTs 650 and 651 is no longer exceeded (because $2^3+2^3=16<64$).

However, a downside of this approach is that a sum for each bit position can only be determined in each logic block by receiving a routed look-up table output from a different logic block. As described herein, with reference to FIG. 3, there is a latency associated with routing data between configurable logic blocks. This means that a 3:1 adder implemented as shown in FIG. 6 has two logic-levels of latency. Because of this, an adder tree as shown in FIG. 2, using a 3:1 adder implemented as shown in FIG. 6, has three logic levels of latency rather than two levels of logic latency as it would initially appear. This is the same number of logic levels of latency as the adder tree shown in FIG. 2.

Figure 7:
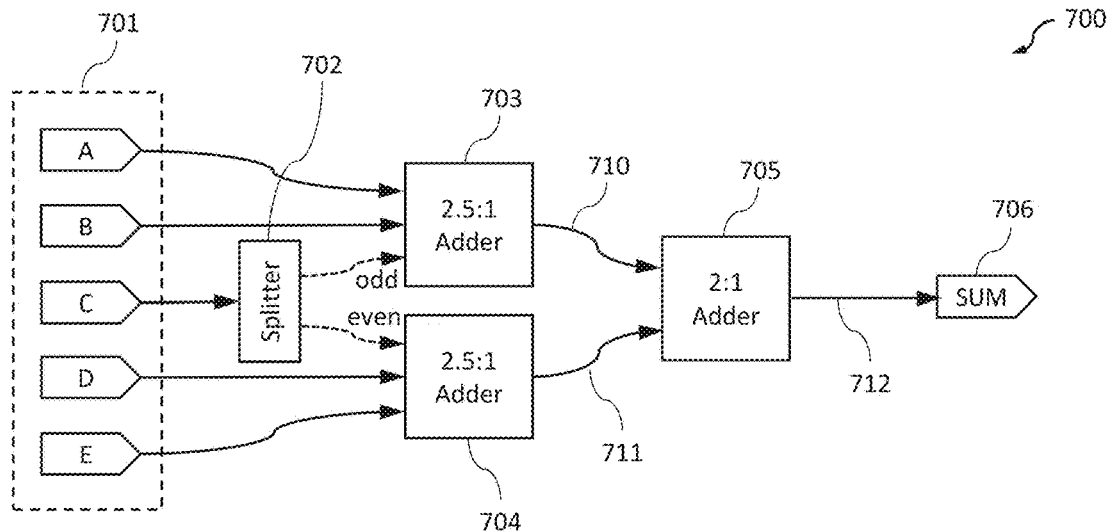
FIG. 7 shows an adder tree consisting of 2.5:1 adders for adding five multiple-bit binary numbers in accordance with the principles described herein.
Figure 8:
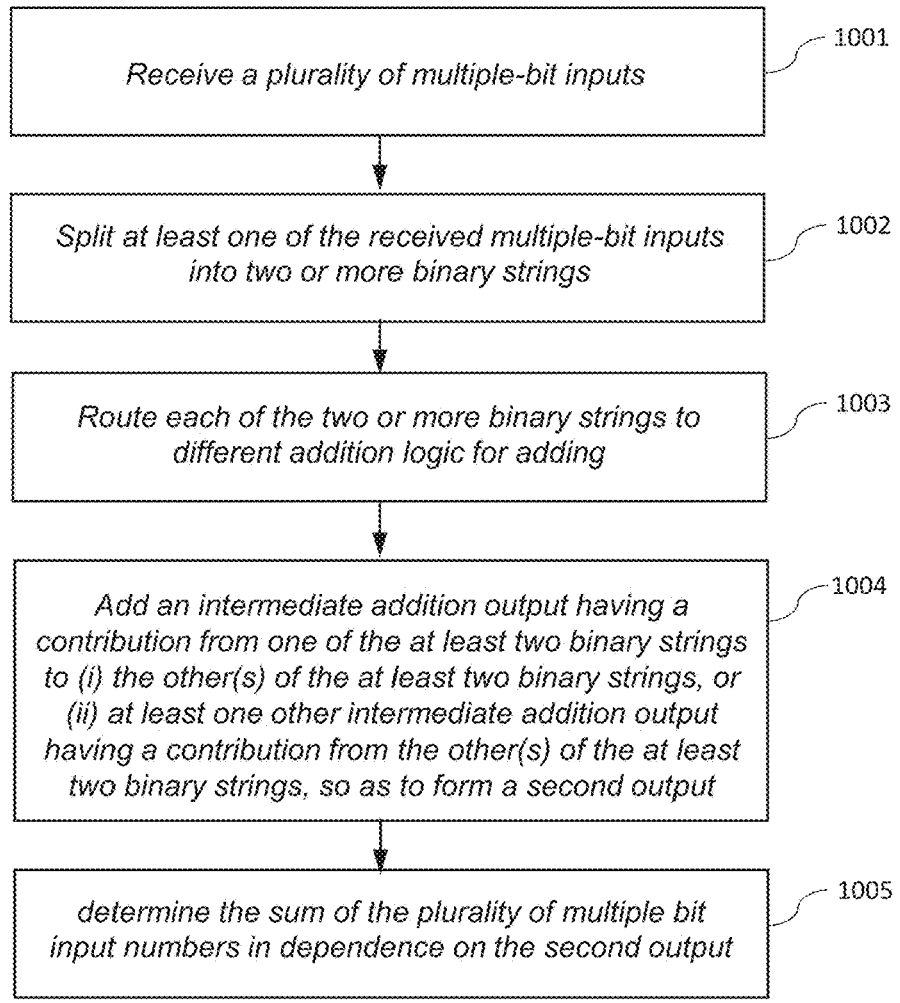
FIG. 8 is a flow diagram showing the method steps for adding a plurality of multiple bit binary numbers in accordance with the principles described herein.

In accordance with the principles described herein, an adder tree can be implemented on XILINX FPGA hardware that can determine the sum of five multiple-bit binary inputs, whilst experiencing just two logic levels of latency. FIG. 7 shows an adder tree consisting of 2.5:1 adders for adding five multiple-bit binary inputs in accordance with the principles described herein. FIG. 8 is a flow diagram showing the method steps for adding a plurality of multiple bit binary numbers in accordance with the principles described herein.

A plurality of multiple-bit binary inputs are received 1001. In the example given in FIG. 7, multiple bit numbers A, B, C, D and E are received as inputs 701 to adder tree 700. Adder tree 700 may comprise 2.5:1 adders 703 and 704, and 2:1 adder 705.

At least one of the received multiple-bit inputs is split into two or more binary strings 1002. As shown in FIG. 7, multiple-bit binary number C is split into two binary strings, labelled "odd" and "even". The split is performed such that sum of the separate binary strings equals the value of the multiple bit binary number before it was split. Each of these binary strings are sent to different adders for adding 1003. As shown in FIG. 7, each of the "odd" and "even" binary strings are sent to different 2.5:1 adders for adding with A and B, and D and E respectively. An intermediate addition output having a contribution from one of the at least two binary strings is added with (i) the other(s) of the at least two binary strings, or (ii) at least one addition output having a contribution from the other of the at least two binary strings, so as to form a second output 1004. The sum of the plurality of multiple bit input numbers is determined 1005 in dependence on the second output. Said determined sum may be output from the adder tree.

Because of the commutative and associative nature of addition, summing the plurality of the received multiple bit inputs in accordance with the principles described herein correctly calculates the sum of the plurality of the received multiple bit inputs. This can be understood with reference to the following equations:

$$A + B + C + D + E$$

where $$C = C_{even} + C_{odd}$$

$$\therefore$$

$$A + B + C + D + E =$$

$$A + B + (C_{even} + C_{odd}) + D + E = (A + B + C_{even}) + (C_{odd} + D + E)$$

With reference to FIG. 7, 2.5:1 adder 703 performs the sum $(A+B+C_{even})$ so as to form an intermediate value 710. The intermediate value 710 has a contribution from $C_{even}$. 2.5:1 adder 704 performs the sum $(C_{odd}+D+E)$ so as to form an intermediate value 711. The intermediate value 711 has a contribution from $C_{odd}$. 2:1 adder 705 adds intermediate values 710 and 711 so as to form a second output 712. The sum 706 of the multiple-bit input numbers A+B+C+D+E is determined in dependence on the second output. In FIG. 7, the second output 712 is the sum 706 of the multiple-bit input numbers A+B+C+D+E. In other examples, the further processing may be performed on the second output so as to determine the sum of the multiple-bit input numbers. It is to be understood that 2.5:1 bit adder 704 and 2:1 adder 705, in combination, could be said to be performing the step of adding the intermediate value 710 to $C_{even}$.

Splitting a multiple-bit binary number may comprise separating its odd and even bits into two separate binary strings, as shown in FIG. 7. In one example, an exemplary 9-bit binary number C may be split into two binary strings, $C_{odd}$ and $C_{even}$, by separating the odd and even bits into a separate binary string as follows:

| | $C_8$ | $C_7$ | $C_6$ | $C_5$ | $C_4$ | $C_3$ | $C_2$ | $C_1$ | $C_0$ |
|---|---|---|---|---|---|---|---|---|---|
| C | 1 | 1 | 0 | 1 | 1 | 0 | 0 | 0 | 1 |
| $C_{odd}$ | 1 | — | 0 | — | 1 | — | 0 | — | 1 |
| $C_{even}$ | — | 1 | — | 1 | — | 0 | — | 0 | — |

$C_{odd}$ and $C_{even}$ are examples of binary strings. Constant values may be placed in the "--" bit positions. A constant value may be a value that is constrained to take a single binary value. Said constant values may be 0. $C_{odd}$ and $C_{even}$ may be referred to as multiple bit binary numbers. It is to be understood that any length multiple bit number can be split in a similar manner.

In another example, splitting a multiple-bit binary number may involve separating every third bit into a separate binary string. For example, an exemplary 9-bit binary number C may be split into three binary strings $C_{(i)}$ $C_{(ii)}$ and $C_{(iii)}$ by separating every third bit into a separate binary string as follows:

| | $C_8$ | $C_7$ | $C_6$ | $C_5$ | $C_4$ | $C_3$ | $C_2$ | $C_1$ | $C_0$ |
|---|---|---|---|---|---|---|---|---|---|
| C | 1 | 1 | 0 | 1 | 1 | 0 | 0 | 0 | 1 |
| $C_{(i)}$ | — | — | 0 | — | — | 0 | — | — | 1 |
| $C_{(ii)}$ | — | 1 | — | — | 1 | — | — | 0 | — |
| $C_{(iii)}$ | 1 | — | — | 1 | — | — | 0 | — | — |

$C_{(i)}$, $C_{(ii)}$ and $C_{(iii)}$ are examples of binary strings. Constant values may be placed in the "--" bit positions. Said constant values may be 0. $C_{(i)}$, $C_{(ii)}$ and $C_{(iii)}$ may be referred to as multiple bit binary numbers. It is to be understood that any length multiple bit number can be split in a similar manner.

Each binary string may not include any two consecutive bits of the split multiple bit binary number. That is, each binary string may comprise a set of non-consecutive bit position values of the multiple bit input value from which they are split. Therefore, in examples, splitting a multiple-bit binary number may involve separating every $X^{th}$ bit into a separate binary string so as to form x separate binary strings. Splitting a multiple-bit binary number into a plurality of binary strings may be performed such that each bit of the split multiple bit binary number contributes to only one of the binary strings and all of the bits of multiple bit binary number are allocated to one of the binary strings.

It is to be understood that, in the edge case in which an multiple-bit binary input comprises one or more constant values in known bit positions, a binary string split from that input may comprise consecutive bits of the input—so long as no two variable bits in consecutive bit positions in the input are placed in the same binary string. For example, this may be possible where the consecutive bits comprise a constant bit and a variable bit, or a pair of variable bits either side of one or more constant bits.

Splitter 702 may be used to split a multiple bit binary input number. Splitter 702 may comprise a set of wiring available on a logic circuit, e.g. a programmable logic circuit such as an FPGA. Splitter 702 may be implemented within a routing block of an FPGA. The splitter 702 may split a multiple bit input into at least two binary strings, and route those two binary strings to different logic blocks. The hardware required to implement splitter 702 is known to person skilled in the art.

In another example, splitter 702 may be implemented on a configurable logic block. For example, splitter 702 may be implemented by ANDing a multiple bit input number received at the configurable logic block with an bit mask (e.g. a 1 0 1 0 1 0 mask where it is desired to maintain only the odd bits of a 6-bit input binary number, or 0 1 0 1 0 1 where it is desired to maintain only the even bits of a 6-bit input binary number).

In the example described with reference to FIG. 7, one of the multi-bit binary inputs is split. It is to be understood that more than one of the multi-bit binary inputs could be split. In examples, all of the multi-bit binary inputs could be split, or any subset of the multi-bit binary inputs could be split.

Figure 9:
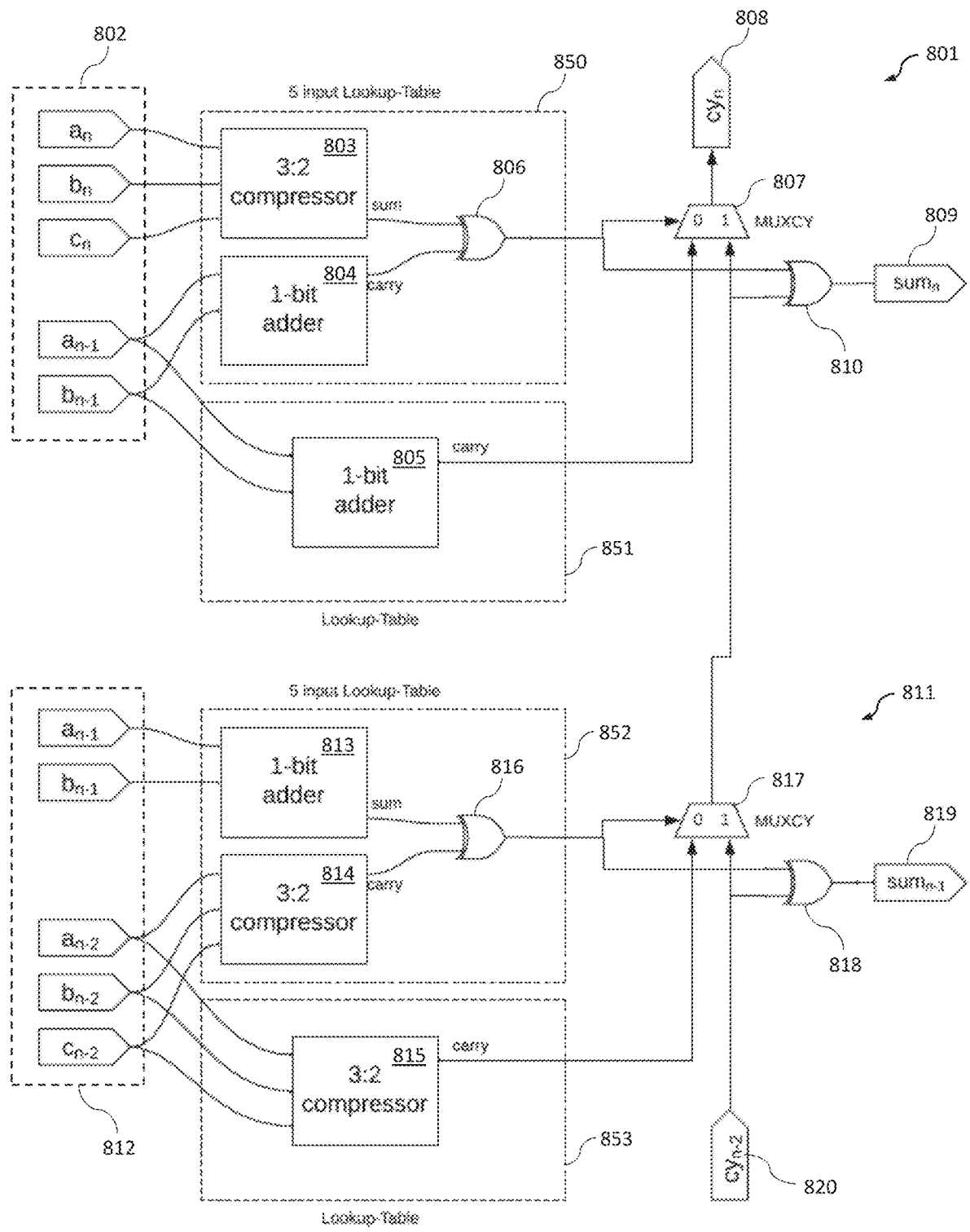
FIG. 9 shows an implementation of a 2.5:1 adder on a logic circuit in accordance with the principles described herein.

FIG. 9 shows an implementation of a 2.5:1 adder on a logic circuit in accordance with the principles described herein. Said logic circuit may be a programmable logic circuit, such as an FPGA. Said logic circuit may be a XILINX FPGA. FIG. 9 shows two logic blocks of said logic circuit.

FIG. 9 shows a possible logic circuit configuration for implementing 2.5:1 adder 703 shown in FIG. 7. That is, FIG. 9 shows a possible logic circuit configuration for implementing a 2.5:1 adder performing the sum $(A+B+C_{even})$.

The logic circuit shown in FIG. 9 comprises two logic blocks 801 and 802. In order to determine the sum of a plurality of multiple bit binary numbers, the number of logic blocks may be commensurate with the number of bits in the multiple-bit binary numbers.

As described herein, one way of outputting a sum of three multiple bit inputs at a current bit position n, using only one carry chain, is to perform a set of logic operations on the bit values at the current bit position n of the three multiple bit inputs and the bit values at the adjacent, less significant bit position n-1, of the three multiple bit inputs.

Input 802 and 812 in FIG. 9 show only the variable inputs to look-up tables 850, 851, 852, 853. It is to be understood that additional constant inputs may be included within inputs 802 and 812. This is because inputting a constant input into a look-up table does not increase the number of possible outcomes from that look-up table.

In accordance with the principles described herein, multiple-bit input $C_{even}$ comprises the even bit position values of the multiple bit input C. The other values may be set to a constant bit value, such as 0. For example, $C_{even}$, may by a 9-bit binary string taking the form: $[c_n\ 0\ c_{n-2}\ 0\ c_{n-4}\ 0\ c_{n-6}\ 0\ c_{n-8}]$. Therefore, there is no variable input value shown for $c_{n-1}$ in FIG. 9. This is because $C_{even}$ does not include the bit value for $c_{n-1}$.

The constant bit values in each of the binary strings derived from an input binary number could be input to the logic block (because they do not increase the number of possible outcomes to be stored in look-up tables). Alternatively, the constant bit values in each of the binary strings derived from an input binary number could be discarded, ignored, or not routed into the logic blocks. That is, only the set of non-consecutive bit position values of the multiple-bit input may be routed to the adder.

Logic blocks 801 and 811 are configured to determine the sum bits 809 and 819 for the sum $(A+B+C_{even})$ at the $n^{th}$ and $(n-1)^{th}$ bit position respectively.

One of the ways in which a configurable logic block may be configurable to perform different logic operations is by controlling the entries in the look-up table (LUT).

Regarding FIG. 9, the circuitry (e.g. the 3:2 compressors, otherwise known as full adders, 803, 814, 815, 1-bit adders, otherwise known as half adders 804, 805, and 813 and XOR 806 and 816) within the LUTs 850, 851, 852, 853 is shown purely as a visual aid. The circuitry itself may not actually be present. Instead, in order to perform the sum at bit position n, LUTs 850 and 851 may store all potential output outcomes for the shown visual aid logic operations were they to be performed on inputs $a_n$, $b_n$, $c_n$ and $a_{n-1}$, $b_{n-1}$, whilst LUTs 852 and 853 may store all potential output outcomes for the shown visual aid logic operations were they to be performed on inputs $a_{n-1}$, $b_{n-1}$, $a_{n-2}$, $b_{n-2}$ and $C_{n-2}$.

Regarding logic block 801, as there is no variable bit value for $c_{n-1}$ in $C_{even}$, the number of inputs into the look-up tables 850 and 851 is reduced (compared to the number of inputs in look up tables 552 and 553 shown in FIG. 5). Look-up table 850 receives five inputs ($a_n$, $b_n$, $C_n$, $a_{n-1}$ and $b_{n-1}$), whilst look-up table 851 receives two inputs ($a_{n-1}$ and $b_{n-1}$). This means the look-up table 850 stores 32 possible output outcomes ($2^5$), whilst look up table 851 stores 4 possible output outcomes ($2^2$). Thus, the total number of possible output outcomes does not exceed the 64-bit limit set for the look-up tables on each configurable logic block of a XILINX FPGA (32+4<64).

LUT 850 may store all potential output outcomes from the sum of a 3:2 compression 803 of bits at the current bit position, n, XOR'ed 806 with a carry from a 1-bit addition 804 of the bits at the previous bit position, (n-1). LUT 851 may store all potential output outcomes from the carry from a 1-bit addition 805 of the bits at the previous bit position, (n-1).

The outputs from such LUTs 850, 851 could be operated on as shown in FIG. 9 by XOR 810, and MUXCY 807, in combination with a carry in from logic block 811, so as to provide a sum 809 for the current bit position, n, and a carry out 808 to be provided to the next logic block (not shown). As described herein, such an operation by XOR 807, and MUXCY 810 would be well understood by the skilled person.

Regarding logic block 811, as there is no variable bit value for $c_{n-1}$ in $C_{even}$, the number of inputs into the look-up tables 852 and 853 is reduced (compared to the number of inputs in look up tables 552 and 553 shown in FIG. 5). Look-up table 852 receives five inputs ($a_{n-1}$, $b_{n-1}$, $a_{n-2}$, $b_{n-2}$ and $c_{n-2}$), whilst look-up table 851 receives three inputs ($a_{n-2}$, $b_{n-2}$ and $c_{n-2}$). This means the look-up table 852 stores 32 possible output outcomes ($2^5$), whilst look up table 853 stores 8 possible output outcomes ($2^3$). Thus, the total number of possible output outcomes does not exceed the 64-bit limit set for the look-up tables on each configurable logic block of a XILINX FPGA (32+8<64).

LUT 852 may store all potential output outcomes from the sum of a 1-bit addition 913 of bits at the bit position, (n-1), XOR'ed 816 with a carry from a 3:2 compression 814 of the bits at the bit position, (n-2). LUT 853 may store all potential output outcomes from the carry from a 3:2 compression 815 of the bits at the bit position, (n-2).

The outputs from such LUTs 852, 853 could be operated on as shown in FIG. 9 by XOR 818, and MUXCY 817, in combination with a carry in 820 from a previous logic block (not shown), so as to provide a sum 819 for the bit position, (n-1), and a carry out to be provided to logic block 801. As described herein, such an operation by XOR 818, and MUXCY 817 would be well understood by the skilled person.

Because there is no need to route bit values from one logic block to the next via routing (as is the case in FIG. 6), a 2.5:1 adder implemented in accordance with the principles described herein (e.g. as described with reference to FIG. 9) experiences just one level of logic latency. Therefore, the adder tree shown in FIG. 7 can add five multiple bit binary inputs whilst experiencing just two levels of logic latency. This is in comparison to adder trees shown in FIGS. 1 and 2, which, as described herein, both experience three logic levels of latency to add five multiple bit binary inputs.

Figure 10:
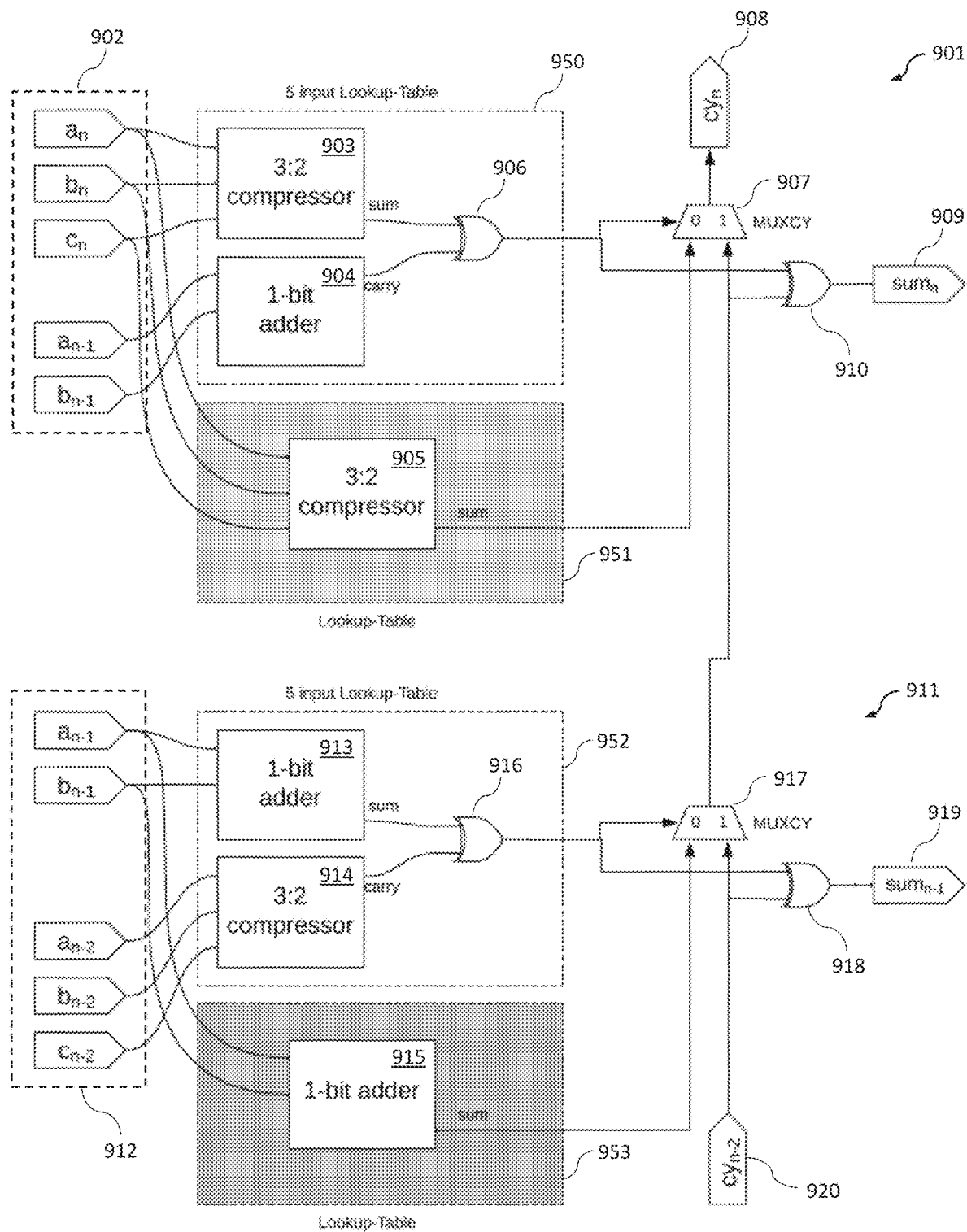
FIG. 10 shows an alternative implementation of a 2.5:1 adder on an FPGA in accordance with the principles described herein.

FIG. 10 shows an alternative implementation of a 2.5:1 adder on an FPGA in accordance with the principles described herein.

Look-up tables (LUTs) 951 and 953 may store possible outcomes for different logic operations compared to those stored in look-up tables 851 and 853 shown in FIG. 9. For example, as shown in FIG. 10, LUT 951 may store all potential output outcomes from the carry of from 3:2 compression 905 of the bits at the bit position, n. LUT 953 may store all potential output outcomes from the carry from a 1-bit add 915 of the bits at the bit position, n-1. This is because the carry out from each logic block may be defined relative to the inputs to that logic block (e.g. the sum and/or carry bits generated by logical operations on the current and/or less significant bit position values input to that logic block) and/or the carry in from the previous logic block any number of different ways that are well understood to the person skilled in the art. In fact, in situations, where MUXCYs 807 and 817, or 907 and 917 are set to carry propagate (e.g. set to 1) the output of LUTs 851 and 853 or 951 and 953 would not affect the carry out for that row. For at least these reasons, there is an element of flexibility in the decision as to which possible outcomes to store in look-up tables (LUTs) 851/951 and 853/953.

Look-up tables (LUTs) 950 and 952 may store the same possible outcomes as look-up tables 850 and 852 shown in FIG. 9.

2.5:1 adder 704, shown in FIG. 7, could also be implemented in accordance with the principles descried herein (e.g. as described with reference to FIGS. 9 and 10) so as to perform the sum ($C_{odd}$+D+E).

Figure 11:
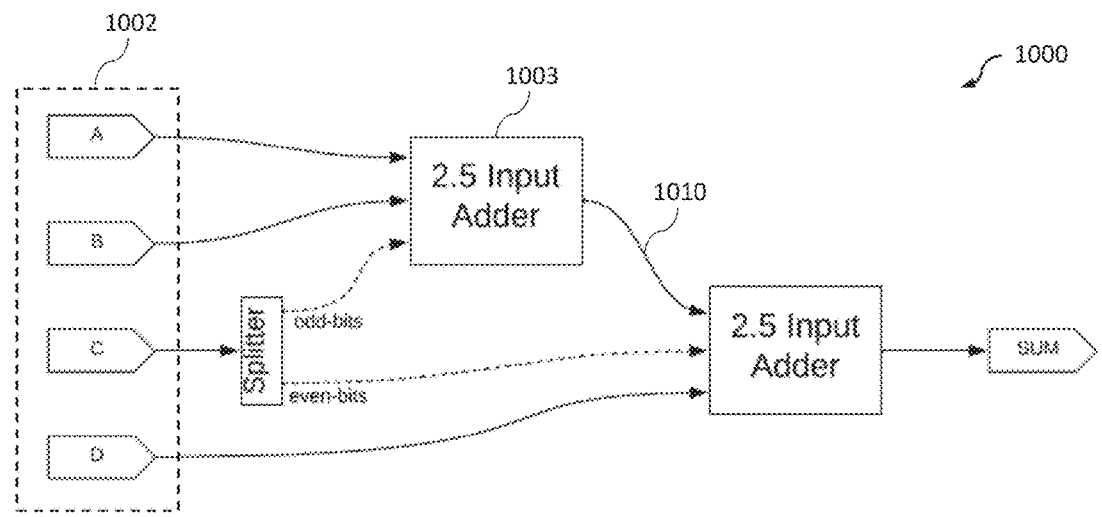
FIG. 11 shows an adder tree consisting of 2.5:1 adders for adding four binary numbers in accordance with the principles described herein.
Figure 12:
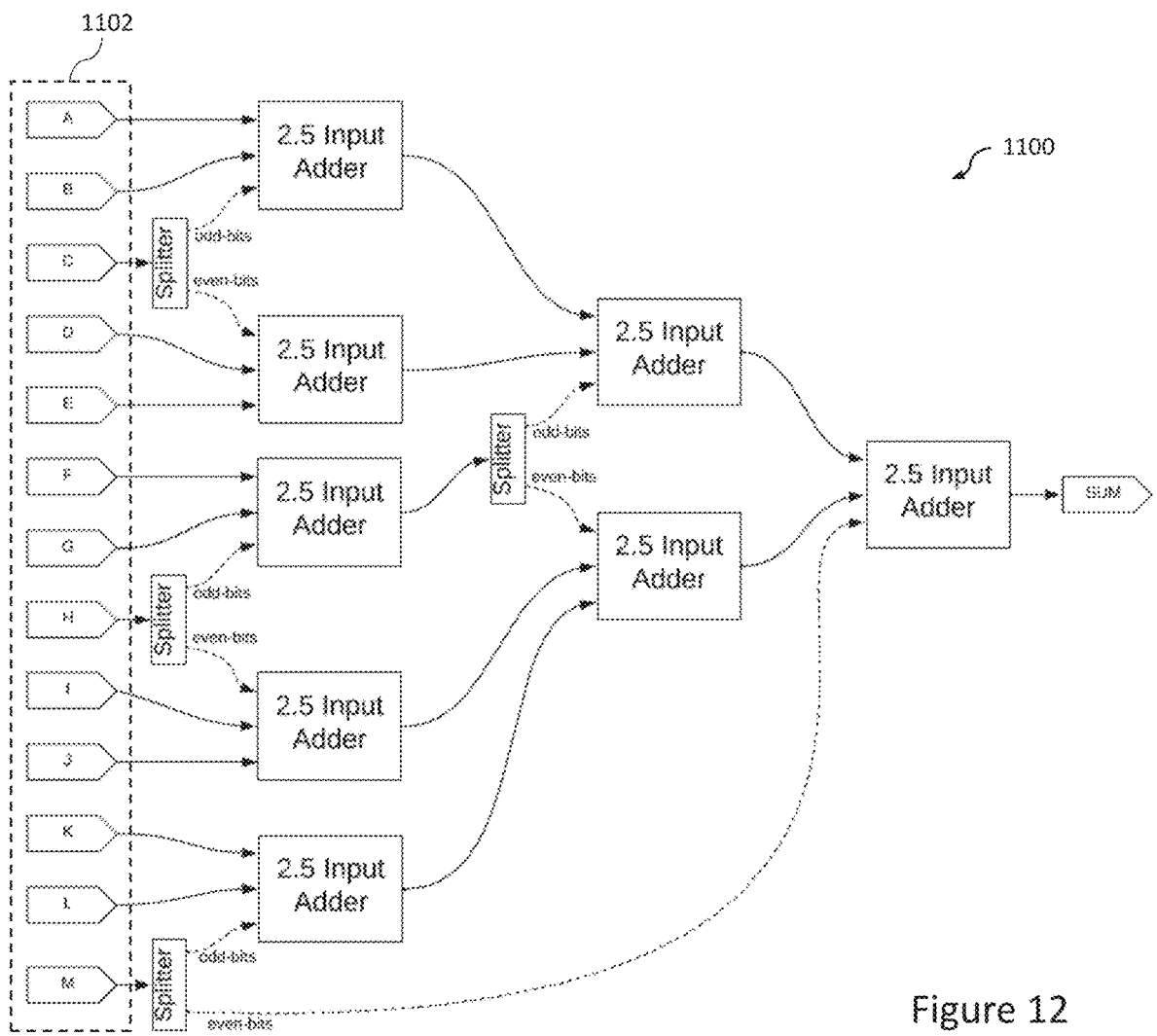
FIG. 12 shows an adder tree consisting of 2.5:1 adders for adding thirteen binary numbers in accordance with the principles described herein.

The principles descried herein could also be used as part of any other adder tree arrangement. For example, FIG. 11 shows an adder tree consisting of 2.5:1 adders for adding four multiple-bit binary inputs in accordance with the principles described herein. Adder 1003 performs the sum (A+B+$C_{odd}$) so as to output an intermediate value 1010. Adder 1003 performs the sum of that intermediate value with $C_{even}$ and D. In another example, FIG. 12 shows an adder tree consisting of 2.5:1 adders for adding thirteen multiple-bit binary inputs in accordance with the principles described herein.

Adder trees configured in accordance with the principles describes herein have a number of advantages over typical adder trees. For example, XILINX FPGAs are typically used to implement adder trees comprising 2:1 adders, 3:1 adders and/or 3:2 compressors. The following table demonstrates the advantages that can be achieved in chip area requirements (e.g. circuit size) and latency by implementing adder trees primarily comprising 2.5:1 adders in accordance with the principles descried herein, compared to adder trees primarily comprising 2:1 adders, 3:1 adders or 3:2 compressors. For size (in logic blocks, e.g. CLBs) the chip area requirement is given as a function of N, where N is the number of adders. For latency (in logic levels) the latency is given as a function of N, where N is the number of adders.

| Adder Tree Primarily Built using: | Size (in CLBs) | Latency (in Logic-levels) |
|---|---|---|
| 2:1 adders | $O(N)$ | $O(1.00*log2(N))$ |
| 3:1 adders | $O(N/2)$ | $O(1.26*log2(N))$ |
| 3:2 compressors | $O(N)$ | $O(1.70*log2(N))$ |
| 2.5:1 adders | $O(0.66*N)$ | $O(0.76*log2(N))$ |

It can be seen from this table that adder trees primarily comprising 2.5:1 adders in accordance with the principles descried herein may be 33% smaller and have 24% lower latency than an adder tree comprising primarily 2:1 adders.

It is to be understood that adders implemented in accordance with the principles described herein need not be limited 2.5:1 adders. For example, adders implemented in accordance with the principles described herein may include 1.5:1 adders (e.g. for performing sums such as A+$B_{odd/even}$), 3.5:1 adders (e.g. for performing sums such as A+B+C+$D_{odd/even}$), 2.33:1 (e.g. for performing sums such as A+B+$C_{(i)/(ii)/(iii)}$), or any other size of adder that is configured to perform a sum including at least one split input.

It is to be understood that a logic block configured in accordance with the principles described herein could be used for performing subtractions. It is to be understood that the phrase "a sum of multiple-bit binary numbers" may be construed herein to include subtractions of one or more of those multiple-bit binary numbers from each other. A skilled person would understand how to perform such subtractions using the addition logic described herein.

It is to be understood that the present disclosure includes the software which defines a configuration of hardware as described herein, such as HDL (hardware description language) software, as is used for configuring programmable logic circuitry (such as FPGAs) to carry out desired functions.

It is to be understood that logic circuits configured in accordance with the principles described herein could be embodied on a single-chip (integrated circuit) substrate or a multiple-chip (integrated circuit) substrate, It is to be understood that logic circuits configured in accordance with the principles described herein could be implemented on any suitable semiconductor substrate material—such as on a silicon-based integrated circuit or a germanium-based integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A logic circuit implemented in hardware, the logic circuit comprising:

inputs for receiving multiple n-bit numbers, n being greater than one; and a plurality of adders, each of the plurality of adders being capable of receiving a plurality of n-bit numbers and forming an output representing the sum of those numbers, each of the plurality of adders having a plurality of single-bit stages and being configured to form the sum by subjecting successive bits of each of the plurality of n-bit numbers received by that adder to an operation in a respective one of the single-bit stages;

the logic circuit being configured to add the multiple n-bit numbers by:

using a splitter, splitting a first one of the multiple n-bit numbers to generate a set of non-consecutive bits of the first one of the multiple n-bit numbers;

in a first adder of the plurality of adders, adding another of the multiple n-bit numbers to a value corresponding to the set of non-consecutive bits of the first one of the multiple n-bit numbers to form a first intermediate value;

using one or more adders of the plurality of adders other than the first adder, adding the first intermediate value to a value corresponding to the bits of the said first one of the multiple n-bit numbers other than those in the said set to form a sum; and outputting the sum.

2. A logic circuit as claimed in claim 1, wherein n is greater than four.

3. A logic circuit as claimed in claim 1, wherein the set of non-consecutive bits of the first one of the multiple n-bit numbers is generated by splitting, using the splitter, the first one of the multiple n-bit numbers into a first binary string comprising the bit values from the even bit positions of that n-bit number and a second binary string comprising the bit values from the odd bit positions of that n-bit number, and wherein the value corresponding to the set of non-consecutive bits is the first binary string or the second binary string.

4. A logic circuit as claimed in claim 1, wherein the logic circuit is implemented on a FPGA, and wherein each of the plurality of single-bit stages comprises a look-up table having a 64-bit limit.

5. A logic circuit as claimed in claim 1, wherein the logic circuit is implemented on a silicon-based integrated circuit.

6. A logic circuit as claimed in claim 1, wherein the logic circuit is implemented on a single integrated circuit substrate.

7. A logic circuit as claimed in claim 1, wherein the least significant bits of all the received multiple n-bit numbers are one.

8. A logic circuit as claimed in claim 1, wherein the least significant bit of at least one of the received multiple n-bit numbers is zero.

9. A logic circuit as claimed in claim 1, wherein each of the plurality of single-bit stages comprises a look-up table having a limit on the number of output outcomes that it can store.

10. A logic circuit as claimed in claim 1, wherein the set of non-consecutive bits of the first one of the multiple n-bit numbers is generated by splitting, using the splitter, the first one of the multiple n-bit numbers into two or more multiple-bit binary strings, a first binary string of the two or more multiple-bit binary strings comprising the set of non-consecutive bits of the first one of the multiple n-bit numbers, and one or more other binary strings of the two or more multiple-bit binary strings comprising the bits of the said first one of the multiple n-bit numbers other than those in the said set.

11. A logic circuit as claimed in claim 10, wherein each of the two or more multiple-bit binary strings is routed to a respective different adder of the plurality of adders.

12. A logic circuit as claimed in claim 1, the logic circuit being configured to add, in an adder of the one or more adders of the plurality of adders other than the first adder:

the first intermediate value, or an intermediate value having a contribution from the first intermediate value; and a value corresponding to the bits of the said first one of the multiple n-bit numbers other than those in the said set, or an intermediate value having a contribution from the bits of the said first one of the multiple n-bit numbers other than those in the said set.

13. A logic circuit, implemented in hardware, configured to determine a sum of a plurality of multiple-bit inputs, the logic circuit comprising a plurality of adders, each of the plurality of adders comprising a plurality of single-bit stages, the logic circuit being configured to:

receive the plurality of multiple-bit inputs;

split, using a splitter, a first multiple-bit input of the plurality of received multiple-bit inputs to generate a set of non-consecutive variable bit position values of the first multiple-bit input;

add, at a first adder of the plurality of adders, the set of non-consecutive variable bit position values of the first multiple-bit input of the plurality of received multiple-bit inputs to a second multiple-bit number derived from the plurality of received multiple-bit inputs so as to form an intermediate value;

add, using one or more adders of the plurality of adders other than the first adder, the intermediate value to remaining variable bit position values of the first multiple-bit input so as to form an output;

determine the sum of the plurality of multiple-bit inputs in dependence on the output; and output the sum of the plurality of multiple-bit inputs.

14. A logic circuit as claimed in claim 13, wherein the second multiple-bit number is selected from the plurality of multiple-bit inputs.

15. A logic circuit as claimed in claim 13, wherein the second multiple-bit number is a set of non-consecutive bit position values of a second multiple-bit input of the plurality of received multiple-bit inputs.

16. A logic circuit as claimed in claim 13, wherein the set of non-consecutive variable bit position values of the first multiple-bit input is generated by splitting, using the splitter, the first multiple-bit input into a first binary string comprising the bit values from the even bit positions of the first multiple-bit input and a second binary string comprising the bit values from the odd bit positions of the first multiple-bit input, and wherein the set of non-consecutive variable bit position values of the first multiple-bit input is the first binary string or the second binary string.

17. A logic circuit as claimed in claim 16, wherein the remaining variable bit position values of the first multiple-bit input is the other of the first binary string and the second binary string.

18. A logic circuit as claimed in claim 13, wherein the logic circuit is embodied on a FPGA, and wherein each single-bit stage comprises a look-up table having a 64-bit limit.

19. A logic circuit as claimed in claim 13, wherein each of the plurality of single-bit stages comprises a look-up table having a limit on the number of output outcomes that it can store.

20. A logic circuit as claimed in claim 13, wherein the set of non-consecutive variable bit position values of the first multiple-bit input is generated by splitting, using the splitter, the first multiple-bit input into two or more multiple-bit binary strings, a first binary string of the two or more multiple-bit binary strings comprising the set of non-consecutive variable bit position values of the first multiple-bit input, and one or more other binary strings of the two or more multiple-bit binary strings comprising the remaining variable bit position values of the first multiple-bit input.

21. A logic circuit as claimed in claim 20, wherein each of the two or more multiple-bit binary strings is routed to a respective different adder of the plurality of adders.

22. A logic circuit as claimed in claim 13, the logic circuit being configured to add, in an adder of the one or more adders of the plurality of adders other than the first adder:
the intermediate value, or a further intermediate value having a contribution from the intermediate value; and
the remaining variable bit position values of the first multiple-bit input, or an intermediate value having a contribution from the remaining variable bit position values of the first multiple-bit input.

23. A non-transitory computer readable storage medium having stored thereon hardware description code comprising configuration instructions that, when executed at a logic circuit implemented in hardware, cause the logic circuit to be configured to add multiple n-bit numbers, the logic circuit comprising:
inputs for receiving multiple n-bit numbers, n being greater than one; and
a plurality of adders, each of the plurality of adders being capable of receiving a plurality of n-bit numbers and forming an output representing the sum of those numbers, each of the plurality of adders having a plurality of single-bit stages and being configured to form the sum by subjecting successive bits of each of the plurality of n-bit numbers received by that adder to an operation in a respective one of the single-bit stages;
the logic circuit being configured to add the multiple n-bit numbers by:
using a splitter, splitting a first one of the multiple n-bit numbers so as to generate a set of non-consecutive bits of the first one of the multiple n-bit numbers;
in a first adder of the plurality of adders, adding another of the multiple n-bit numbers to a value corresponding to the set of non-consecutive bits of the first one of the multiple n-bit numbers to form a first intermediate value;
using one or more adders of the plurality of adders other than the first adder, adding the first intermediate value to a value corresponding to the bits of the said first one of the multiple n-bit numbers other than those in the said set to form a sum; and
outputting the sum.

24. A logic circuit as claimed in claim 23, wherein each of the plurality of single-bit stages comprises a look-up table having a limit on the number of output outcomes that it can store.

* * * * *